United States Patent [19]
Watt

[11] 3,766,555
[45] Oct. 16, 1973

[54] COMPUTING DIGITAL AVERAGING PHASE METER

[75] Inventor: Richard E. Watt, San Diego, Calif.

[73] Assignee: Cubic Corporation, San Diego, Calif.

[22] Filed: Sept. 28, 1972

[21] Appl. No.: 293,106

[52] U.S. Cl................ 343/14, 324/83 R, 324/186, 343/5 DP
[51] Int. Cl.......................... G01s 9/24, G01r 25/00
[58] Field of Search................. 343/14, 12 R, 5 DP; 324/83 D, 83 R, 186

[56] References Cited
UNITED STATES PATENTS

| | | | |
|---|---|---|---|
| 3,315,253 | 4/1967 | Geller | 324/83 D |
| 3,223,998 | 12/1965 | Hose | 343/5 DP |
| 3,360,797 | 12/1967 | Picou | 343/14 |
| 3,521,283 | 7/1970 | Angelle | 343/14 |
| 3,728,025 | 4/1973 | Madigan et al. | 343/14 |

Primary Examiner—Benjamin A. Borchelt
Assistant Examiner—G. E. Montone
Attorney—Marvin H. Kleinberg

[57] ABSTRACT

In a ranging system, a first modulating signal is detected as an indication of the "fine" range from the transmitter to the target. A second modulating signal, a combined signal including "fine" range signal, and a "coarse" range signal is also detected. A digital phase meter sequentially measures the phase of the "fine" modulating signal and the combined signal, referred to a common reference. The results are simultaneously algebraically combined to obtain an indication of the "fine" range and the "coarse" range.

9 Claims, 2 Drawing Figures

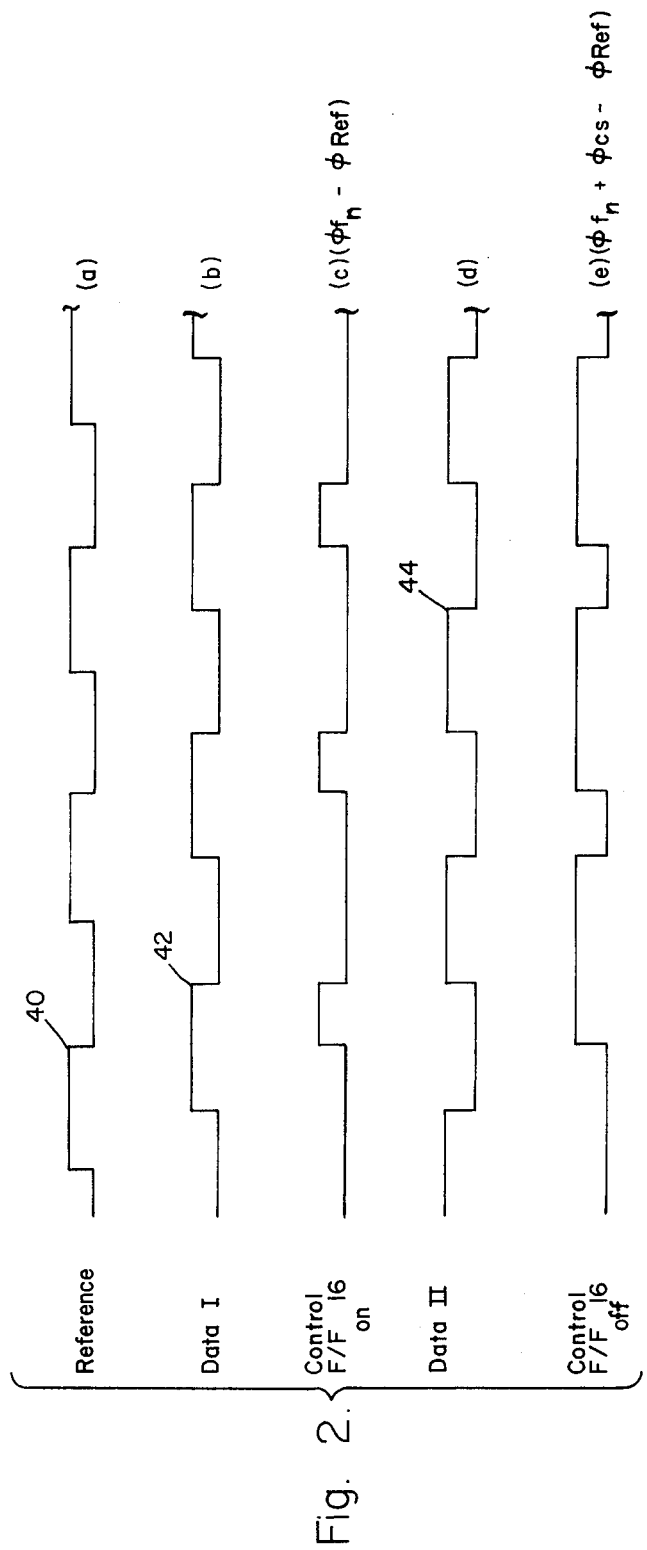

COMPUTING DIGITAL AVERAGING PHASE METER

BACKGROUND OF THE INVENTION

1. Field of the Invention

This invention relates to digital phase meters and, more particularly, to a phase meter for performing simultaneous algebraic operations.

The phase between two corresponding signals may be defined as the time or distance measured in degrees between corresponding portions of two different signals having the same frequency. The phase difference between a pair of sine waves having the same frequency can be measured between corresponding portions when the individual sine waves cross the zero axis.

By considering either square waves or sine waves having the same frequency, the phase can usually be measured between corresponding portions where the individual waves cross the zero axis. For example, the distance between the positive transition of a first wave crossing the zero axis and the positive transition of a second wave crossing the zero axis is a measure of the phase difference between the two waves. Although difference is usually measured in degrees, in a digital time system, the phase difference can be measured in terms of an accumulated count of discrete pulses generated by a suitable clock generator.

2. Description of the Prior Art

It is well known that the phase difference between a pair of corresponding signals may be measured either by the "distance" between "positive" transitions of the two signals or by measuring the distance between "negative" transitions of the two signals. Both signals are usually symmetrical, and hence both readings or distances should be the same. In a copending application, Ser. No. 293108, filed Sept. 28, 1972, entitled SYMMETRICAL WAVE DIGITAL PHASE MEASURING SYSTEM of the present inventor and assigned to the same assignee, a phase measuring system is described in which the individual signals are not symmetrical. The teachings of the referred to patent application may be used in the present patent application should the measured signals be found to be not symmetrical.

A second copending Pat. application, Ser. No. 293107, filed Sept. 28, 1972, entitled AMBIGUITY FREE DIGITAL AVERAGING PHASE METER of the present inventor, and assigned to the same assignee, describes a system for eliminating the ambiguities in measuring the phase between two signals, when the reference signal and the data signal are in phase with each other. Provision is made for eliminating the possibility of making readings in the vicinity of "zero" phase difference by adding 360° to the signals in question.

Phase measurements between 0° and 180° are, in reality, measured between 360° and 540° by adding 360° to the signals being measured. Phase differences between 180° and 360° are measured in the conventional manner. Both the reference signal and the data signal are divided in frequency, and the phase difference between the divided signals are compared. The data signal is inhibited for only 180° of the original reference signal to prevent initial comparing of phase differences between the data signal and the reference signal and to thereby establish the proper polarity relationship between the divided data signal and the divided reference signal. The teachings of the referred to patent application may be used in the present patent application to eliminate the possibility of measurement ambiguity in the presence of "zero" phase difference between the measured signals.

Phase measuring systems have found wide applicability in angle measuring systems and distance measuring systems. So-called "Loran" navigation systems transmit a pair of accurately located signals in which the measured phase or time difference between the signals is an indication of present location on the Earth. The navigator receives and detects the pair of signals and, by means of suitable digital phase measuring equipment, accurately measures the phase or the time between the pair of signals. The phase difference can then represent his position on the face of the Earth. Accurate phase measuring equipment is therefore necessary to determine precise location as a function of time.

Distance measuring systems of the so-called continuous wave type (cw Radar) continuously compare the phase of a transmitted cw signal with a received cw signal as a measure of the distance of the object from the point of transmission. The phase difference between the transmitted wave and the received wave can be related to the actual distance of the object from the transmitter. Ranging systems utilizing digital phase meters are fully described in U.S. Pat. Nos. 3,078,460 and 3,300,680, which are assigned to the same assignee as the present invention.

In continuous wave digital ranging systems, it is the common practice to take repetitive readings over a period of time in order to normalize the total reading and reduce the effects of external signals that may be generated as a result of noise or other outside phenomena. A typical ranging system will have a carrier signal, for example, at 400 MHz and may use a plurality of modulating frequencies to obtain ranging information. In one system "fine" range measurements are obtained by using a 15 MHz modulating frequency, and "coarse" range measurements are obtained by using a 1.50 MHz modulation frequency. In the usual case, each ranging frequency is used as a modulating signal to obtain the described "fine" and "coarse" range measurements. Coherency of information is obtained by first modulating the 15.0 MHz "fine" frequency signal on the carrier signal and measuring the phase between the returned demodulated "fine" frequency signal and a locally generated reference signal. The "coarse" range is obtained by modulating the 1.5 MHz signal on the carrier and measuring the phase between the transmitted and received signal to obtain the "coarse" range.

It will be apparent to those skilled in the art that many intermediate range frequencies may be used. For a two-tone system just described, the band width required is 2 × 13.5 or 27 MHz. If a very coarse range of 150 KHz is added, the bandwidth required becomes 2 × 14.85 or 29.7 MHz.

In an effort to reduce the bandwidth required, a system sometimes called "folding" the modulation frequency is used. In the folding system, the "fine" frequency of 15 MHz is used as before, however the "coarse" frequency of 1.5 MHz is combined with it by either adding or subtracting. The result, if subtracting, of 13.5 MHz is used to modulate the carrier. The bandwidth required is now 2 × 1.5 MHz or 3.0 MHz. By adding a "very coarse" frequency of 150 KHz, the bandwidth for the "folded" system is not increased. However, the bandwidth for the unfolded system is increased to 2 × 14.85 or 29.7 MHz.

In addition, the combining of frequencies can be repeated, depending upon the actual resolution required by the system. For example, in some systems it may be only necessary to combine twice and generate only two modulating signals to obtain the accuracy desired. As many as four combined signals have been generated by combinging the "intermediate" frequency with the "fine," combining the "coarse" with the "fine," and the combining the "very coarse" with the "fine," and sequentially modulating all these combined signals on the carrier signal.

SUMMARY OF THE INVENTION

The problem solved by the present invention is the simultaneous measuring of the phase of the returned signal, together with the computation necessary to extract the intermediate frequency, the coarse freqency or the very coarse frequency.

Consider, for example, a system using the 15 MHz "fine" data signal for "fine" range and 1.5 MHz signal for "coarse" range information. If we assume that the "fine" frequency is combined with "coarse" frequency by adding both frequencies, we have produced a "fine" frequency (F) and a combined frequency (F + CS) consisting of the "fine" frequency and the "coarse" frequency (CS).

The phase meter is required to measure the phase of each of the two signals with respect to a locally generated reference signal and also to resolve the phase information of the received signals to thereby recover the true phase of the coarse signal (CS) and the fine frequency (F). Having assumed a combined signal where the "fine" frequency has been added to the "coarse" frequency, we can show that the phase of the detected combined signal with respect to a reference signal will be the phase of the "fine" (F) frequency plus the phase of the "coarse" (CS) frequency, minus the phase of the reference frequency.

In a similar manner, the phase of the detected "fine" (F) frequency will be the phase of the "fine" frequency minus the phase of the reference signal. The phase of the "coarse" signal can then be shown to be the phase of the combined signal less the phase of the fine signal. The digital phase counter (comprised of the accumulator, Down and Up counters), after measuring the phase of the "fine" frequency, contains the value of plus "fine" in the UP counter and minus "fine" in the DOWN counter. The information in the UP counter is actually the phase of the "fine" frequency signal and can be immediately read into a register for indicating the "fine" range.

The output of the DOWN counter, however, is transferred into the UP counter so as to preset the UP counter with the information presently contained in the DOWN counter. This information is actually the negative of the phase of the "fine" frequency minus the reference frequency or, expressed positively, is the phase of the reference frequency minus the phase of the "fine" frequency.

A subsequent phase measurement of the combined signal with respect to a reference signal will generate a signal indicating the phase of the "fine" frequency plus the "coarse" frequency minus the phase of the reference frequency, minus the phase of the "fine" signal previously preset into the UP counter. Hence the resulting information will mathematically indicate the phase of the "coarse" signal.

This simultaneous measurement of phase and arithmetic computation has wide applicability in many digital phase meter applications and is not limited to ranging situations involving "coarse" or "fine" ranges. The foregoing example is given by way of explanation only to help explain and understand the concepts of the present invention.

The novel features which are believed to be characteristic of the invention, both as to organization and method of operation, together with further objects and advantages thereof, will be better understood from the following description considered in connection with the accompanying drawings in which the preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 2 is a series of waveforms illustrating the operation of the diagram illustrated in FIG. 1.

DESCRIPTION OF THE PREFERRED EMBODIMENT

Figure 1:
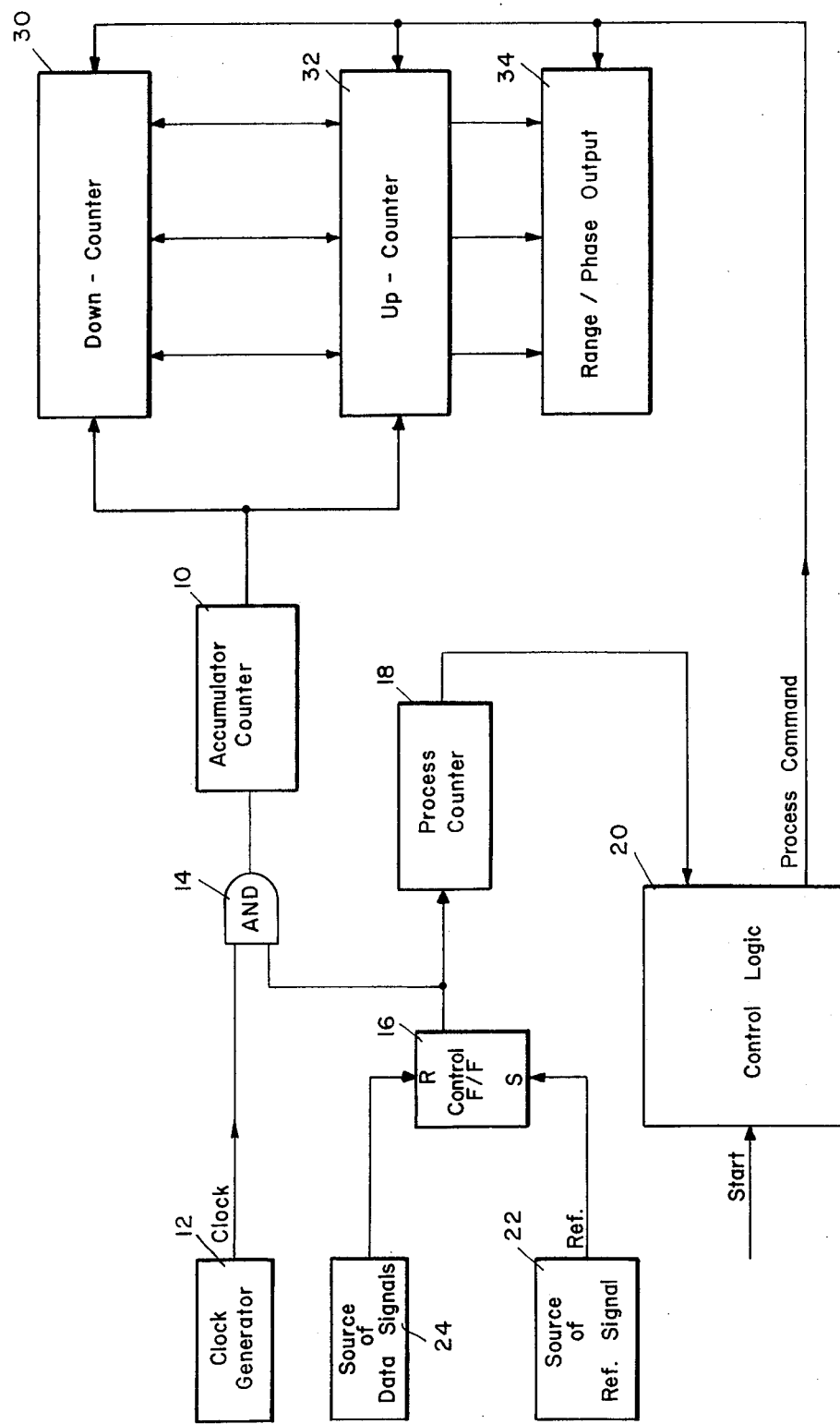
FIG. 1 is a block diagram of the present invention.

Referring now to FIG. 1, there is shown an Accumulator Counter 10 being fed by a Clock Generator 12 through an AND gate 14. The AND gate 14 is controlled by a Control Flip-Flop 16 that also controls a Process Counter 18 which counts the number of cycles of the Control Flip-Flop 16 as an indication of the number of averages made by the system for any given reading.

The number of averages is preset and used as a means for stopping the total accumulation after the preset number of averages has been obtained. The output of the Process Counter 18 feeds a Control Logic unit 20 which performs the necessary logical controls and generates the necessary process commands in response to the needs of external circuits.

The Control Flip-Flop 16 is adapted to operate on negative transition signals. A Source of Reference Signals 22 is fed to the set terminal of the Control Flip-Flop 16 to set or turn ON the Control Flip-Flop in the presence of a negative going pulse generated by the Source of Reference Signals 22.

Similarly, a Source of Data Signals 24 is fed to a reset terminal of the Control Flip-Flop 16 so as to reset or turn OFF the Control Flip-Flop 16 in the presence of a negative going signal generated by the Source of Data Signals 24. The Control Flip-Flop 16 will therefore be turned ON by the Source of Reference Signals 22 and will be turned OFF by the Source of Data Signals 24 and hence will allow clock pulses generated by the Clock Generator 12 to be accumulated through the AND gate 14 by the Accumulator Counter 10 and the UP/DOWN counters 32 and 30 for a period of time as measured by the phase difference between the reference signal and the data signal.

In the preferred embodiment, the frequency of the Clock Generator 12 is closely related to the frequency of the Source of Data Signals 24 so as to generate a thousand pulses for one complete 360° cycle. One thousand accumulated pulses will therefore indicate a 0° phase difference between the reference signal and the data signal, and similarly, an accumulation of 500 cycles will represent a 180° phase relationship between the data signal and the reference signal.

The operation of the arithmetic computation will be more fully appreciated by considering the following situation where the first reading of the fine frequency (F) is called Data I and represents the phase measurement made as a result of measuring the phase of the "fine" frequency against the reference signal. The output of the phase meter can be represented as follows:

$$\text{Phase Data I} = \phi F - \phi \text{Ref} \tag{1}$$

The subsequent phase measurement identified as Data II will represent the phase measurement between the combined "coarse" frequency (CS) and "fine" frequency (F) related to the phase of the locally generated reference (Ref) and can be expressed mathematically as follows:

$$\text{Phase Data II} = \phi F + \phi CS - \phi \text{Ref} \tag{2}$$

Since Data I equals the "fine" frequency and Data II equals the "fine" frequency plus a "coarse" frequency, it is apparent therefore that the "corase" frequency can be expressed mathematically as follows:

$$\text{Coarse frequency} = \text{Data II} - \text{Data I} \tag{3}$$

The phase of the coarse frequency or the coarse frequency itself is therefore determinable by performing the subtraction of the phase of Data I from the phase of Data II by subtracting Equation (2) from Equation (1) as follows:

$$\phi CS = \phi F + \phi CS - \phi \text{Ref} - [\phi F - \phi \text{Ref}] = \phi F + \phi CS - \phi \text{Ref} - \phi F + \phi \text{Ref} = \phi CS \tag{4}$$

Since in the conventional ranging system the fine frequency phase is measured first, it is desirable to rewrite Equation (3) as follows:

$$\text{Coarse frequency} = -\text{Data I} + \text{Data II} \tag{5}$$

The Accumulator Counter 10 and the UP/DOWN counters 32 and 30, after measuring the phase of Data I, now contains an accumulation of pulses equivalent to the phase of the fine frequency. During the measurement process, the output of the Accumulator Counter 10 is fed simultaneously to a DOWN Counter 30 and an Up Counter 32. Both the DOWN Counter 30 and the UP Counter 32 start from zero, and hence the accumulation in the DOWN Counter 30 will represent a value that is − Data I, whereas the accumulation in the UP Counter 32 will represent a value of + Data I or the fine frequency phase itself, as indicated by Equation (1).

The information in the UP Counter 32 is read out in a Range/Phase Output register 34 as an indication of the fine frequency. The register 34 is arranged to readout the range or phase in miles or feet, depending upon the frequency of the modulating signals used. For the modulating frequencies given in this example, the register 34 will have a five-position readout. The three least significant digits are fed by the UP Counter 32 in response to the fine readout.

The DOWN Counter 30 contains − Data I, and a transfer of the information contained in the DOWN Counter 30 is made into the Up Counter 32, so that the UP Counter 32 is now preset with the information from the DOWN Counter 30. A review of Equation (5) shows that the UP Counter 32 now contains the information defined as − Data I. The Control Logic unit 20 generates the necessary process commands for controlling the presetting and resetting of the counters and the readout of the register 34 by means of the control line labeled Process Command.

The digital phase meter when measuring the phase difference between the Data II signal and the reference signal will accumulate counts in the Accumulator Counter 10 and UP/DOWN Counters 32 and 30 that is equivalent to the phase of fine frequency plus the phase of the coarse frequency less the phase of the reference as indicated by Equation (2). The output of the Accumulator Counter 10 is fed to both the DOWN Counter 30 and the UP Counter 32. However, since the UP Counter 32 already contains − Data I as shown by Equation (5), it will be apparent that adding to the accumulation of − Data I an amount equal to + Data II will result in an accumulation in the UP Counter 32 of a number equal to the phase of the coarse frequency as shown by Equation (5).

The output of the UP Counter 32 is fed to the register 34 in such a manner that the three least significant digits are masked and only the fourth and higher positions are indicated. In this manner the digits indicating the fine range are not disturbed or modified by any variation between the lower order digits of the coarse frequency in view of any discrepancy that may exist between the total coarse frequency indication and the fine frequency indication. The information of the Data II fed to the DOWN Counter 30 in the last operation is a redundant step and has no value in this example.

Referring now to FIG. 2, there is shown a series of waveforms in which curve (a) represents the reference signal generated by the Source of Reference Signals 22. The Data I signal is indicated in curve (b), and the output of the Control Flip-Flop 16 is represented by curve (c). A review of curve (c) will shown that the first negative going transition 40 of the reference curve will turn the Control Flip-Flop 16 ON and that the first negative going transition 42 of the Data I signal will turn the Control Flip-Flop 16 OFF, thereby accumulating a count in the Accumulator Counter 10 and UP Counter 32 equivalent to the phase difference between the reference and Data I signal, which is indicated by Equation (1).

In a similar manner, curve (d) illustrates an arbitrary signal representing a Data II signal, and curve (e) indicates the phase difference between the reference signal and the Data II signal as an indication of the time that the Control Flip-Flop 16 is turned ON. For example, the negative going transition 40 of the reference (a) turns the Control Flip-Flop 16 ON.

The negative transition 44 of the Data II curve will turn the Control Flip-Flop 16 OFF as shown in curve (e). It can be appreciated therefore that the accumulation of pulses as indicated by curve (e) will represent a signal indicated by Data II which is a representation of the phase of the fine frequency plus the phase of the coarse signal less the phase of the reference.

A review of this disclosure will show that the combined signals representing Data II may consist of two signals that are either added or subtracted from each other. The foregoing examples were based on a case where the two signals were added. However, the same benefits of the present invention may be achieved, where Data II is derived by subtracting the two signals from each other. In such a case Equation (2) will be modified as follows:

$$\text{Phase Data II} = \phi F - \phi CS - \phi \text{Ref} \quad (6)$$

Similarly, Equation (3) is modified to now read:

$$\text{Coarse Frequency} = \text{Data I} - \text{Data II} \quad (7)$$

The implementation of Equation (7) is very similar to the implementation of Equation (3) since the Data I information is accumulated in the Accumulator Counter 10, the DOWN Counter 30 and the UP Counter 32, as mentioned previously. The information in the UP Counter 32 is + Data I and is transferred to the DOWN Counter 30 which is now preset with the + Data I information.

At the same time, the output of the UP Counter 32 is fed to the register 34 as before, since the output of the UP Counter 32 is a + Data I and that represents the fine frequency phase. In the second operation of determining the phase of the Data II as indicated now by Equation (6), the feeding of the Data II information, via Accumulator Counter 10, into the DOWN Counter 30 will actually result in − Data II information being accumulated in the DOWN Counter 30 on top of the + Data I information. This results in the generation of the coarse phase reading in the DOWN Counter 30, which is then transferred to register 34 for readout purposes, in the same fashion as mentioned previously.

While the invention has been described in connection with a pair of signals, it is quite apparent that the process may be expanded for operation with more than two data phases. It will be apparent, therefore, that the process can be expanded to three or more sequential data inputs.

What is claimed as new is:

1. A system for extracting phase information from a pair of CW signals comprising:
    means for generating a first signal from a first frequency representative of a first indicia,
    means for generating a second signal by algebraically combining said first frequency signal with a signal from a second frequency representing a second indicia,
    means for measuring the phase difference between said first signal and a local reference signal to obtain a first phase difference indication,
    means for measuring the phase difference between said second signal and said local reference signal to obtain a second phase difference indication, and
    means for algebraically combining said first and second phase difference indications with each other to generate the phase of the second frequency representative of said second indicia.

2. A system according to claim 1 in which said second signal is generated by adding said first frequency representative of the first indicia with said second frequency representative of said second indicia.

3. A system according to claim 2 in which said measured first phase difference and said measured second phase difference are algebraically differenced for obtaining the phase of said second frequency.

4. A system according to claim 2 which includes
    means for accumulating said first phase difference simultaneously in a DOWN counter and an UP counter,
    means for reading the output of said UP counter as an indication of said first indicia, and
    means for subsequently presetting the information from said DOWN counter into said UP counter,
    means for accumulating said second phase difference in said UP counter, and
    means for reading the output of said UP counter as an indication of said second indicia.

5. A system for extracting ranging information from a pair of modulating signals comprising:
    means for generating a first modulating signal from a first frequency representative of fine range,
    means for generating a second modulating signal by algebraically combining said first frequency with said second frequency representative of corase range,
    means for measuring the phase difference between said first modulating signal and a local reference signal to obtain a first phase difference indication,
    means for measuring the phase difference between said second modulating signal and said local reference signal to obtain a second phase difference indication,
    and mean for algebraically combining said first and second phase difference indication with each other to generate the phase of said second frequency representative of corase range.

6. A system according to claim 5 in which said second modulating signal is generate by subtracting said first frequency representative of fine range from said second frequency representative of coarse range.

7. A system according to claim 6 which includes means for accumulating said first phase difference simultaneously in a DOWN counter and an UP counter,
    means for reading the output of said UP counter as an indication of fine range,
    means for subsequently presetting the information from said UP counter into said DOWN counter,
    means for accumulating said second phase difference in said DOWN counter and,
    means for reading the output of said DOWN counter as an indication of coarse range.

8. A system for extracting ranging information from a pair of modulating signals comprising:
    the first signal having a known characteristic of range adapted to modulate a carrier signal,
    the second signal having a combination of said known characteristic and an unknown characteristic of range adapted to modulate said carrier signal,
    a digital phase detector for measuring the phase of said first signal relative to the phase of a known reference signal, said digital phase detector sequentially measuring the phase of second signal relative to the phase of said known reference signal, and means for combining said measured phase differences in the proper sense for obtaining an output representing said unknown characteristic.

9. In a system for extracting ranging information from a pair of modulating signals in which the first signal has a known characteristic of fine range and the second signal is an algebraic combination of said first signal and a second signal having unknown characteristic of coarse range the improvement comrpising:

a digital phase detector for measuring the phase of the first signal relative to the phase of the known reference signal, said digital phase detector measuring the phase of the second signal relative to the phase of said known reference signal, and means for algebraically combining said measured phase differences in the proper sense to obtain an output representing coarse range.

means for generating a first modulating signal from a first frequency representative of fine range,

* * * * *

UNITED STATES PATENT OFFICE
CERTIFICATE OF CORRECTION

Patent No. 3,766,555  Dated October 16, 1973

Inventor(s) RICHARD E. WATT

It is certified that error appears in the above-identified patent and that said Letters Patent are hereby corrected as shown below:

Col. 6, line 47, change "shown" to --show--

Col. 8, line 43, change "generate" to --generated--

Col. 10, lines 10-11, delete "means for generating a first modulating signal from a first frequency representative of fine range,"

IN THE DRAWINGS:

In Fig. 2: In the third line, cancel "on" and change the expression "$\phi f_n$" to --$\phi F$--

On the last line, cancel "off" and change the expression "$\phi f_n$" to --$\phi F$--

Signed and sealed this 3rd day of December 1974.

(SEAL)
Attest:

McCOY M. GIBSON JR.
Attesting Officer

C. MARSHALL DANN
Commissioner of Patents